United States Patent [19]
Shabet

[11] 3,853,383
[45] Dec. 10, 1974

[54] ELECTRICAL CONNECTOR FOR THERMOCOUPLE SYSTEMS

[76] Inventor: Edward K. Shabet, 4 Truro Rd., Butler, N.J. 07405

[22] Filed: June 7, 1973

[21] Appl. No.: 367,900

[52] U.S. Cl.......... 339/95 R, 339/176 T, 339/256 S
[51] Int. Cl............................................ H01r 13/12
[58] Field of Search................ 339/95, 176 T, 256 S

[56] References Cited
UNITED STATES PATENTS

| | | | |
|---|---|---|---|
| 1,485,175 | 2/1924 | Ellis | 339/256 S |
| 2,997,687 | 8/1961 | Walter | 339/176 T |

FOREIGN PATENTS OR APPLICATIONS

| | | | |
|---|---|---|---|
| 270,038 | 8/1970 | U.S.S.R. | 339/256 S |

Primary Examiner—Joseph H. McGlynn
Attorney, Agent, or Firm—Sherman & Shalloway

[57] ABSTRACT

An electrical connector particularly useful in thermocouple systems including a plug assembly having a pair of plug members extending therefrom and adapted to be electrically connected to a thermocouple junction and a jack assembly having a pair of jack terminals for contacting the plug members and adapted to be connected with a thermocouple junction, each of the plug terminals being constructed of a thermocouple extension wire coiled cylindrical portion having a pair of spaced coils and bent to define a wiper arm extending through the space such that the wiper arm and the cylindrical portion are formed of the same wire to contact the plug members.

20 Claims, 5 Drawing Figures

PATENTED DEC 10 1974 3,853,383
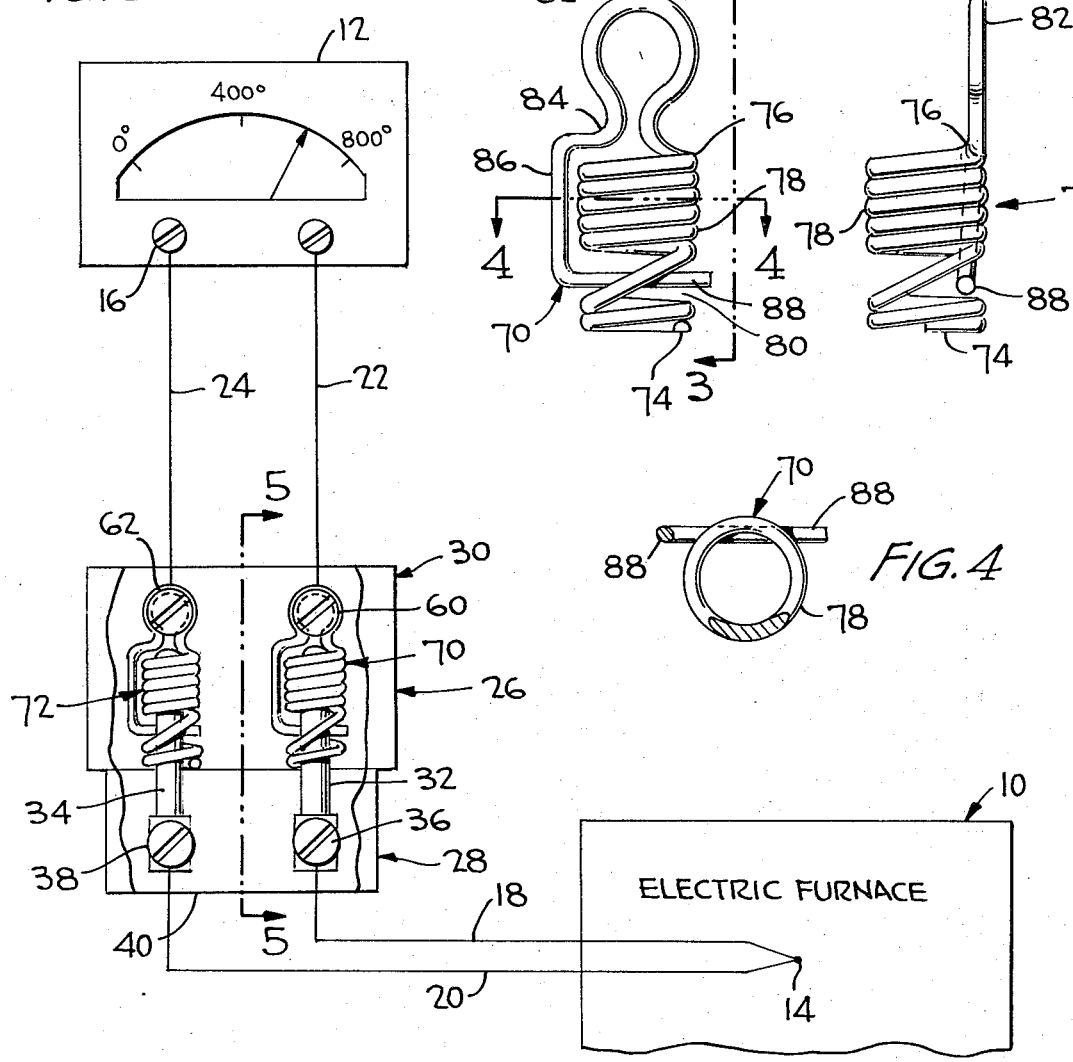
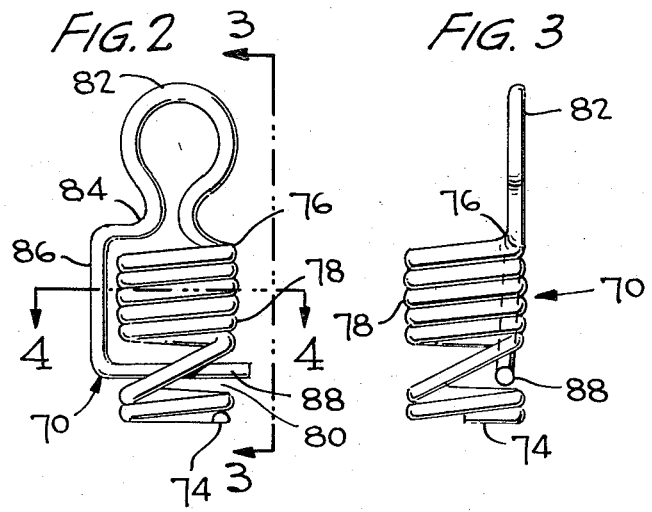
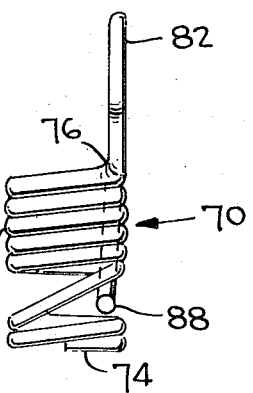
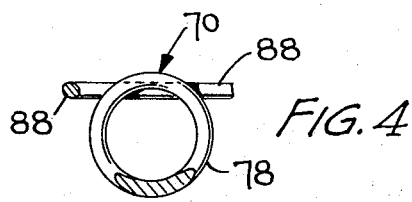
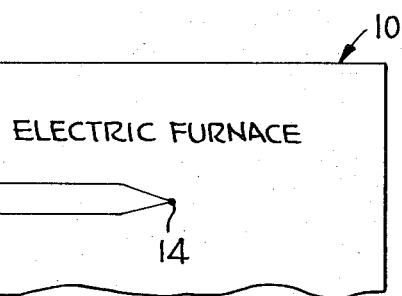
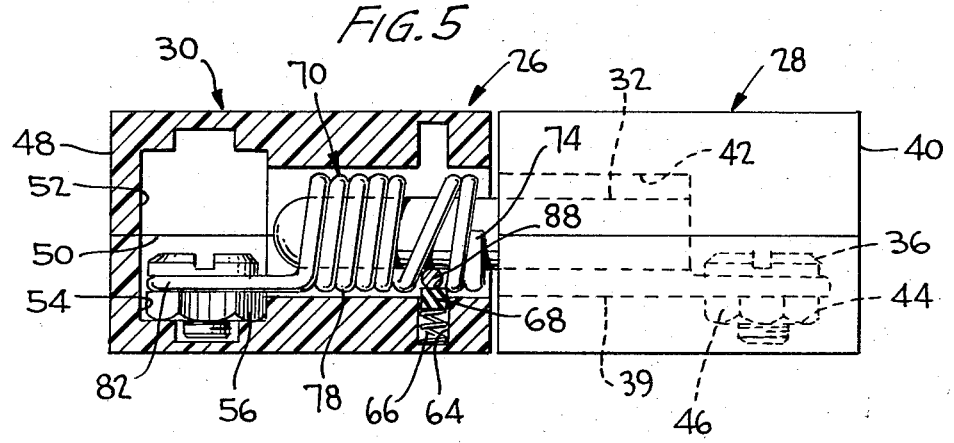

ELECTRICAL CONNECTOR FOR THERMOCOUPLE SYSTEMS

BACKGROUND OF THE INVENTION

1. Field of the Invention

The present invention pertains to thermocouple systems and, more particularly, to an electrical connector therefor.

2. Discussion of the Prior Art

Thermocouple systems are conventionally utilized to measure temperatures for a great many applications and normally are formed of an indicator device to either display or record EMF corresponding to temperature and a thermoelectric circuit including a thermocouple, an electrical thermocouple connector and extension wires extending from the electrical thermocouple connector to the indicator device. The thermocouple is composed of two dissimilar metals in the form of wires connected together and exposed to the thermal conditions desired to be monitored, for instance, the heating chamber of an oven or furnace, to determine the temperature therein. This junction of the dissimilar metals is referred to as the measuring or hot junction. The electrical connector includes plug and jack assemblies connecting the hot junction of the thermocouple to the extension wires which, in turn, are connected to the cold junction or temperature-compensated reference usually positioned in the indicator device. The EMF induced in the thermoelectric circuit by the thermocouple is a function of the metal composition of the wires and the temperature at the hot junction, the cold junction and the plug and jack assembiles. When the reference temperature at the cold junction is known, the measured EMF may be correlated with the temperature at the hot junction by reference to a calibration table compiled for the particular thermocouple utilized.

The measurements obtained with such thermocouple systems are accurate assuming no EMF errors are induced in the thermoelectric circuit at the connection where the plug and jack assemblies are joined. To this end, it is noted that a connector utilizing a metal dissimilar to the thermocouple material, such as spring steel, to contact the thermocouple material will induce EMF errors in the thermoelectric circuit if there is a difference in temperature from one end of the spring to the other end. The amount of error caused by this additional EMF cannot be predicted as it is a function of the type of thermocouple used, the gauge of the thermocouple and extension wire, the ambient temperature between the jack and plug assemblies and the amount of time elapsed after joining the plug and jack assemblies prior to the recording of EMF measurements.

In view of the above, it is desirable to use special electrical connectors in thermocouple systems in order to obtain accurate measurements, such special electrical connectors being required rather than ordinary power type plug and jack assemblies in that the latter type of connector creates a number of junctions of dissimilar metals. Since the thermocouple and the measuring or indicator device are usually at different temperature levels, an extraneous electrical voltage is introduced into the thermoelectric circuit by the additional number of junctions of dissimilar metals thus modifying the thermocouple EMF to produce a significant and inconsistent error in temperature measurements. A good thermocouple connector should provide near perfect thermal and electrical conductivity; however, most prior art thermocouple connectors available at this time do not meet the criteria to be considered a good thermocouple connector, such criteria including good wiping action in order to remove dirt and oxides from the contact surfaces when the plug and jack assemblies are joined together. This wiping action is conventionally obtained by attaching steel springs to the jack thermocouple material; however, this approach creates thermal interference due to EMF errors produced by the steel spring in parallel with each jack terminal.

Basically, there are two types of conventional thermocouple connectors. A first type utilizes steel wiping springs in contact with the thermocouple material as discussed above whereas the second type utilizes an insulator disposed between a steel wiping spring and the jack thermocouple material. The jack material with both of the above types of conventional thermocouple connectors is made from thermocouple bar stock with a hole machined through the center for insertion of the plug, and additional metal working operations on the thermocouple bar stock are required for functional effect and physical mounting of the jack terminal in a phenolic housing, such metal working operations including machine milling, punching, tapping holes and, with large mechanical presses, physically upsetting sections of the thermocouple bar stock. These additional metal working operations have the disadvantage of altering the thermocouple characteristics of the bar stock and causing instability in the calibration thereof.

In the first type of thermocouple connector mentioned above, the steel spring is directly reveted to each terminal of the jack thermocouple material in order to provide good wiping action; however, while this arrangement provides good electrical conduction when the plug and jack assemblies are joined, thermal EMF errors are induced in the thermoelectric circuit due to the steel spring being a dissimilar metal relative to the jack material thereby effecting a secondary thermocouple in parallel with the jack material. In the second type of thermocouple connector mentioned above, an insulator is disposed between the spring and the jack material so that no part of the spring touches the jack or plug material in order to eliminate thermal errors caused by the steel wiping spring directly contacting the jack or plug material. The object of this construction is that the spring loaded insulator forces the plug thermocouple material against the walls of the jack thermocouple material when the plug and jack are joined; however, while this approach on its face appears to provide a solution for an ideal thermocouple connector, tests have shown that this design does not meet either criteria for a good thermocouple connector. That is, by placing an insulator between the spring and the thermocouple contact material, wiping action can only occur at the top portion of the jack wall directly opposite the spring force when the plug is received in the jack. Since the inside walls of the jack and the outside surface of the plug thermocouple material are straight and smooth, no lands and grooves are provided along the surface thereof for disposing of dirt and oxides once they are wiped from the plug. A minute speck of dirt trapped between the jack wall and the plug member will cause an open circuit and thus has the disadvantage of being responsible for a total failure in the thermocouple system. Furthermore, an open circuit will occur when the plug is slightly twisted relative to the jack after both parts are joined in that by forcing the plug against the spring loaded insulator, the plug is physically separated from the wall of the jack.

SUMMARY OF THE INVENTION

Accordingly, it is an object of the present invention to provide a thermocouple connector overcoming the above-mentioned disadvantages of the prior art.

Another object of the present invention is to form jack terminals for a thermocouple connector of thermocouple wire to facilitate construction and reduce metal working operations.

A further object of the present invention is to provide a thermocouple connector that is directly interchangeable with either assemblies of conventional prior art thermocouple connectors.

The present invention has another object in the designing of both plug and jack assemblies of a thermocouple connector to utilize the same phenolic housing thereby reducing tooling, stock and components.

Yet, an additional object of the present invention is to form a jack terminal of coiled thermocouple extension wire forming a receptacle portion with a wiper arm extending therethrough in order to permit excellent wiping action when the jack terminal is connected with a plug member without utilizing other metals which could introduce EMF errors in thermoelectric circuits.

A further object of the present invention is to provide a jack assembly having positive and negative jack terminals fabricated from different gauge thermocouple extension wire to provide receptacle portions of the same outer diameter but different inner diameters.

The present invention has another object in that an electrical connector for use in a thermocouple system is formed of a plug assembly including a housing having a pair of plug members extending therefrom and a jack assembly including a housing with a pair of jack terminals disposed therein, each jack terminal being formed of a conductive wire coiled to define a receptacle portion with a space between coils and bent to define a wiper arm extending through the space such that the plug members will contact the receptacle portions and the wiper arms when the plug and jack assemblies are joined.

An additional object of the present invention is to provide a jack assembly for a thermocouple system formed of a conductive wire coiled to define a receptacle portion and having a wiper arm extending through the receptacle portion and adapted to provide wiping contact with the plug member inserted in the receptacle portion.

Some of the advantages of the present invention over the prior art are that the electrical connector of the present invention provides excellent thermal and electrical conductivity, excellent wiping action is provided when the plug and jack assemblies are joined while lands and grooves are provided within receptacle portions of the jack terminals to collect dirt and other foreign matter, the plug and jack assemblies can be constructed to be directly interchangeable with conventional prior art connectors, the plug and jack assemblies utilize the same phenolic housings thereby reducing tooling, stock and component cost, the forming of the jack terminals of thermocouple wire rather than machining such terminals from thermocouple bar stock reduces waste as well as cost, there are no excessive metal working operations as required for jack terminals machined from thermocouple bar stock and, thus, the possibility of altering the thermocouple characteristics of the thermocouple material is eliminated, the electrical connector provides excellent thermal and electrical characteristics due to the inner walls of the jack terminals being formed of lands and grooves to permit excellent wiping action between plug and jack assemblies when they are joined together, and the electrical connector is inexpensive relative to prior art connectors while being superior in electrical and thermal characteristics.

The present invention is generally characterized in a jack terminal for use in a jack assembly for a thermocouple system formed of a conductive wire coiled to define a receptacle portion and having a wiper arm extending through the receptacle portion and adapted to provide wiping contact with a plug member inserted in the receptacle portion, and the present invention is further generally characterized in an electrical connector formed of a plug assembly including a housing having a plug member extending therefrom and a jack assembly including a housing with a jack terminal as described above disposed therein whereby the receptacle portion and the wiper arm are adapted to contact the plug member when the plug and jack assemblies are joined.

Other objects and advantages of the present invention will become apparent from the following description of the preferred embodiment taken in conjunction with the accompanying drawings.

BRIEF DESCRIPTION OF THE DRAWINGS

FIG. 1 is a diagram of a thermocouple system utilizing an electrical connector in accordance with the present invention.

FIG. 2 is a top view of a jack terminal constructed in accordance with the present invention.

FIG. 3 is a side view of the jack terminal of FIG. 2.

FIG. 4 is a section taken along line 4—4 of the jack terminal of FIG. 2.

FIG. 5 is a section taken along line 5—5 of the electrical connector of FIG. 1.

DESCRIPTION OF THE PREFERRED EMBODIMENT

A thermocouple system for measuring the temperature in a chamber 10, such as an electric furnace, and displaying the measured temperature at an indicator meter device 12 is illustrated in FIG. 1. The thermoelectric circuit for the thermocouple having a hot measuring junction 14 exposed to the environment within the chamber 10 and a cold reference junction 16 formed within the meter 12. As is conventional in thermoelectric circuits, the thermocouple junctions are formed by the contact of dissimilar metals such that leads 18 and 20 are formed of dissimilar thermocouple materials and contact to form hot junction 14. The leads 18 and 20 are connected with extension wires 22 and 24, respectively, by an electrical connector 26 constructed in accordance with the present invention. It will be appreciated that the thermocouple system may be utilized to measure any desired temperature and, similarly, the measured temperature need not be displayed, as diagrammatically illustrated in FIG. 1, but rather can be recorded or otherwise detected as required for a specific application.

As shown in the broken top plan view of FIG. 1 and the section of FIG. 5, the electrical connector 26 is formed of a plug assembly 28 and a jack assembly 30. The plug assembly 28 includes a pair of cylindrical plug or male members 32 and 34 electrically connected with leads 18 and 20 at screws 36 and 38, respectively, mounted in a phenolic housing 40 by resistance welding to coils 39 of thermocouple wire. The housing 40 is formed with a recess 42 therein to accommodate the plug members 32 and 34 and recesses 46 accommodating nuts 44 in a non-rotating manner to receive the screws 36 and 38 and connect the thermocouple leads 18 and 20 with the plug members 32 and 34, respectively, through the coils 39.

The jack assembly 30 according to the present invention is formed of a phenolic housing 48 which, like housing 40, is composed of two halves sealed together along a center line 50. Housing 48 is symmetrical about the center line 50 such that all of the housing halves may be cast from the same mold, and each housing half includes a recess 52 formed therein having a pair of cavities 54 for non-rotatably receiving nuts 56 threadedly engaging screws 60 and 62 and a pair of smaller cavities 64, each receiving a coiled spring 66 and an insulator 68.

A pair of jack terminals 70 and 72 are seated in the recess 52 and electrically connected with extensive wires 22 and 24 at screws 60 and 62, respectively. The jack terminals 70 and 72 are identical; and, thus, only jack terminal 70 is shown in FIGS. 2–5 and described hereinafter. Jack terminal 70 is integrally fabricated of substantially 1/16 inch diameter solid, bare, thermocouple extension wire approximately 7 inches in length. The thermocouple extension wire is coiled in a circular manner from an end 74 to a point 76 to form a cylindrical receptacle portion 78 having an inner diameter slightly greater than the outer diameter of plug member 32, and the receptacle portion 78 has a space 80 formed between a pair of coils near end 74. From point 76, the thermocouple extension wire is bent almost 360° to form a loop 82 disposed in a plane passing substantially tangentially to the coils of cylindrical receptacle portion 78; and, from the loop 82, the thermocouple extension wire is offset at 84 to form a longitudinally extending leg 86 external of the receptacle portion 78 from which a wiper arm 88 is bent to extend transversely therefrom through the space 80. The wiper arm 88 is aligned with cavity 64 when loop 82 is secured in housing 48 by screw 60 such that the wiper arm 88 is forced toward the center of the coiled receptacle portion 78 by the spring 66 and the insulator 68.

When the plug and jack assemblies 28 and 30 are joined, the plug members 32 and 34 contact the inner surfaces of the coils of the receptacle portions 78 of jack terminals 70 and 72, respectively, as well as contacting the spring biased wiper arms 88. Since the coiled cylindrical portions 78 of the jack terminals are formed by the same thermocouple extension wires as the wiper arms 88, the problem of forming various junctions of dissimilar metals as above described with respect to conventional thermocouple connectors are eliminated; and, since the inner surface of the coiled jack terminals inherently is formed of lands and grooves, the trapping of dirt or other foreign materials between the plug members and the jack terminals is prevented while excellent wiping action is provided by wiper arms 88. Furthermore, since no dissimilar metal contacts the thermocouple material, excellent thermal conductivity is obtained. If the jack assembly 30 is twisted against the plug assembly 28, no open circuit will be caused because either the inner surface of the coiled receptacle portions or the wiper arms, which are formed by the same thermocouple extension wire, will always contact the plug members to complete the connections.

The amount of movement of the wiper arm 88 required to provide proper wiping action is less than 0.020 of an inch, and included in this movement is a torsion bar effect on the thermocouple extension wire that greatly reduces the stress at offset point 84. Thus, while at first glance it appears that the thermocouple extension wire would be weak and subject to fracture at offset point 84, the thermocouple extension wire is strong along the entire length thereof; and, after careful analysis and extensive testing, no failures or damage to the jack terminals have been found to be caused by environmental conditions or by 2,000 cycles of joining and disconnecting the plug and jack assemblies. After the plug and jack assemblies are joined, the maximum movement of the thermocouple extension wire is less than 0.005 inch due to the tolerances between the inner diameter of the coiled jack terminal and the outer diameter of the plug member, and vibration tests on the thermocouple connector 26 have caused no failures of any kind.

The plug and jack assemblies 28 and 30 of the thermocouple connector 26 can be constructed in accordance with the present invention to be directly interchangeable with the plug and jack assemblies of conventional thermocouple connectors. Tooling, stock and component costs of the thermocouple connector of the present invention can be substantially reduced by designing the plug and jack assemblies to use the same phenolic housing, each housing being formed of two identical halves. In this case, the positive jack terminal is desirably formed from 14 gauge (0.064 inch) thermocouple extension wire while the negative jack terminal is formed from 16 gauge (0.050 inch) thermocouple extension wire in that for polarity purposes, the plug assembly positive and negative plug members do not have the same outside diameter but yet in order to use the same phenolic housing, the outside diameter of both coiled jack terminals must be the same. Accordingly, by using two different gauge thermocouple extension wires in the jack assembly, the inner diameters of the jack terminals can differ without any difference in the outer diameters. For example, the positive jack terminal, such as 70, can be formed of 14 gauge thermocouple extension wire to provide an inner diameter of 0.161 inch and an outer diameter of 0.289 inch, and the negative jack terminal, such as 72, can be formed of 16 gauge thermocouple extension wire to provide an inner diameter of 0.189 inch and an outer diameter of 0.289 inch. This same approach can also be used for the plug assembly by resistance welding the plug members to coiled thermocouple extension wire of different gauge.

The thermocouple connector 26 according to the present invention has been described with reference to circular terminals and plug members as are conventional; however, the thermocouple extension wire forming the jack terminals can be coiled in oval configurations in cross-section to receive flat plug members or in any other cross-sectional configuration as is economically or functionally desirable. Similarly, the thermocouple extension wire can have any desirable cross-sectional configuration such as square, hexagonal or the like. Additionally, while the electrical connector according to the present invention is particularly advantageous for use with thermocouple systems, the electrical connector can be utlized for any high or low voltage applications where excellent wiping action is required.

While the jack terminal has been described as being constructed of thermocouple extension wire, any wire having the same thermoelectric characteristics could be used therefor. Similarly, if the jack terminal is used for other applications, the bias spring 66 and the insulator 68 will not be needed if the jack terminal is made of spring wire, which inherently provides a spring force on the wiping arm.

Inasmuch as the present invention is subject to many variations, modifications and changes in detail, it is intended that all subject matter described above or shown in the accompanying drawings be interpreted as illustrative and not in a limiting sense.

What is claimed is:

1. A jack terminal for use in a jack assembly wherein a plug is received in the jack terminal comprising:
a continuous length of wire coiled to define a receptacle portion having a plurality of coils and having a portion thereof bent to form a wiper arm which extends through said receptacle and between said coils to provide wiping contact with the plug member when the plug member is inserted in said receptacle.

2. The jack terminal of claim 1 wherein the wire of the receptacle is spring wire.

3. The jack terminal of claim 1 wherein the wiper arm extends through said receptacle in a direction transverse to an axis about which the coils are formed.

4. The jack terminal of claim 1 wherein the jack assembly with which the terminal is used is utilized specifically with a thermocouple system utilizing thermocouple extension wire.

5. A jack terminal as recited in claim 4 wherein said wire is thermocouple extension wire.

6. A jack terminal as recited in claim 4 wherein said receptacle portion has a cylindrical configuration.

7. A jack terminal as recited in claim 4 wherein said thermocouple extension wire is circular in cross-section.

8. A jack terminal as recited in claim 4 wherein said receptacle portion has a space formed between coils thereof and said wiper arm extends through said space.

9. A jack terminal as recited in claim 8 wherein said conductive wire has a loop formed at one end of said receptacle portion and a leg extending longitudinally externally of the receptacle portion to said wiper arm, said wiper arm extending transversely from said leg.

10. A jack terminal as recited in claim 9 wherein said conductive wire is thermocouple extension wire circular in cross-section and said receptacle portion has a cylindrical configuration.

11. An electrical connector for use in a thermocouple system comprising
a plug assembly including a housing with a plug member extending therefrom; and
a jack assembly including a housing with a jack terminal disposed therein to electrically connect with said plug member, said jack terminal being formed of a continuous length of conductive wire formed into coils that define a receptacle portion for receiving said plug member, said coils having a space therebetween and said wire being bent to define a wiper arm which extends through said space whereby said receptacle portion and said wiper arm contact said plug member when said plug member is received therein.

12. An electrical connector as recited in claim 11 wherein said jack assembly includes spring means biasing said wiper arm toward the center of said receptacle portion of said jack terminal.

13. An electrical connector as recited in claim 12 wherein said spring means includes an insulator engaging said wiper arm and a coiled spring mounted in compression between said jack assembly housing and said insulator.

14. An electrical connector as recited in claim 13 wherein said plug assembly includes a second plug member extending from said plug assembly housing and said jack assembly includes a second jack terminal disposed in said jack assembly housing.

15. An electrical connector as recited in claim 14 wherein said plug members have cylindrical configurations and said receptacle portions of said jack terminals have mating cylindrical configurations.

16. An electrical connector as recited in claim 14 wherein said wires forming said jack terminals are of different diameters.

17. An electrical connector as recited in claim 16 wherein the outer diameters of said receptacle portions of said jack terminals are the same and the inner diameters of said receptacle portions of said jack terminals are different.

18. An electrical connector as recited in claim 14 wherein said wires forming said jack terminals are each shaped to define a loop at one end of said receptacle portion and said jack assembly includes screw means adapted to connect said loops of said jack terminals with extension wires.

19. An electrical connector as recited in claim 18 wherein said wires forming said jack terminals are thermocouple extension wires circular in cross-section and each of said wires has a leg extending from said loop externally of said receptacle portion to said wiper arm, said wiper arm extending transversely from said leg.

20. An electrical connector as recited in claim 19 wherein said plug assembly includes thermocouple wires and a pair of screw means connecting each of said thermocouple wires, each of said thermocouple wires being resistance welded to one of said plug members.

* * * * *